US011223395B1

(12) United States Patent
Marupaduga et al.

(10) Patent No.: US 11,223,395 B1
(45) Date of Patent: Jan. 11, 2022

(54) SYSTEM AND METHODS FOR MONITORING AND CHANGING DUAL TECHNOLOGY ANTENNA OPERATION

(71) Applicant: T-MOBILE INNOVATIONS LLC, Overland Park, KS (US)

(72) Inventors: Sreekar Marupaduga, Overland Park, KS (US); Rajveen Narendran, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 20 days.

(21) Appl. No.: 16/715,665

(22) Filed: Dec. 16, 2019

(51) Int. Cl.
| | |
|---|---|
| *H04B 7/0426* | (2017.01) |
| *H01Q 3/26* | (2006.01) |
| *H04W 52/48* | (2009.01) |
| *H04W 52/46* | (2009.01) |
| *H04W 52/38* | (2009.01) |

(52) U.S. Cl.
CPC ......... *H04B 7/0426* (2013.01); *H01Q 3/2605* (2013.01); *H04W 52/383* (2013.01); *H04W 52/46* (2013.01); *H04W 52/48* (2013.01)

(58) Field of Classification Search
None
See application file for complete search history.

(56) References Cited

U.S. PATENT DOCUMENTS

| | | | | |
|---|---|---|---|---|
| 9,362,991 | B2* | 6/2016 | Maltsev | H04W 52/26 |
| 10,405,219 | B2* | 9/2019 | Feldkamp | H04L 41/147 |
| 10,856,353 | B2* | 12/2020 | Tarimala | H04W 76/27 |
| 2013/0171983 | A1* | 7/2013 | Zhang | H04W 28/08 |
| | | | | 455/422.1 |
| 2020/0045627 | A1* | 2/2020 | Wolfe | H04L 5/0092 |
| 2020/0213874 | A1* | 7/2020 | Tang | H04L 41/0681 |
| 2020/0305091 | A1* | 9/2020 | Lee | H04W 52/365 |
| 2021/0136838 | A1* | 5/2021 | Khalid | H04W 28/24 |

* cited by examiner

*Primary Examiner* — Tri H Phan (57) ABSTRACT

Embodiments herein disclose systems, methods, and computer-readable media for automatically adjusting settings of antenna elements to reduce radio link failures. In embodiments, a base station monitors radio link failures occurring at the base station that are associated with a first technology, such as 5G protocol. When the radio link failures meet or exceed a predefined or predetermined threshold, the base station may adjust a portion of antenna elements in an antenna array controlled by the base station, in some embodiments. For example, the base station may only adjust those antenna elements in the antenna array that are associated with the first technology, while other antenna elements in the same antenna array that are associated with a second technology, such as 4G protocol, are not adjusted.

17 Claims, 6 Drawing Sheets

SYSTEM AND METHODS FOR MONITORING AND CHANGING DUAL TECHNOLOGY ANTENNA OPERATION

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

In embodiments discussed herein, an antenna array may be partitioned so that different elements in the antenna array may operate different technologies. In some embodiments, this virtual configuration refers to the antenna array operating in a dual technology mode, or Evolved-Universal Terrestrial Radio Access-New Radio Dual Connectivity ("EN-DC") mode, based on a radio controlling antenna array. When operating in the dual technology mode, an antenna array may concurrently connect to and communicate with user equipment using at least two distinct wireless technologies. For example, when operating in the EN-DC mode, the radio and antenna array may support a concurrent connection to base stations current user equipment capable of 5G protocols and legacy user equipment that only supports less than 5G protocol(s). Further, when operating in the EN-DC mode, the radio and antenna array may facilitate a base station to concurrently serve as a Long Term Evolution (LTE) Evolved Node B (eNodeB) and a $5^{th}$ Generation (5G) Next Generation Node B (gNodeB) in a telecommunications network.

In some embodiments, the antenna elements in the antenna array may be managed, and automatically adjusted for each of the two or more distinct wireless technologies by the radio of a base station. For example, one group of antenna elements associated with one technology may be adjusted independently from another group of antenna elements in the same array associated with a different technology. In this way, the radio and antenna array operating in an EN-DC mode may implement changes for a particular technology while maintain operations of another technology, all at the same antenna array.

For example, when radio link failures occur at a base station corresponding to the antenna array, the transmit power may be increased or decreased for a portion of the antenna elements of the antenna array that are associated with a first technology. The remaining antenna elements that are associated with a second technology may not be adjusted, in this example. Additionally or alternatively, when radio link failures occur at the base station corresponding to the antenna array, the electronic tilt may be increased or decrease for a portion of the antenna elements of the antenna array that are associated with first technology. The remaining antenna elements that are associated with a second technology may not be adjusted, in this example. The adjustments in transmission power or strength, and/or electronic tilt of only a portion of the antenna elements that corresponds to a particular technology may reduce radio link failures occurring at the base station.

BRIEF DESCRIPTION OF THE DRAWINGS

Aspects of the present technology are described in detail herein with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Definitions

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
BRS Broadband Radio Service
CD-ROM Compact Disk Read Only Memory
CDMA Code Division Multiple Access
EIRP Equivalent Isotropically Radiated Power
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
MIMO Multiple-Input Multiple-Output
mMIMO Massive Multiple-Input Multiple-Output
MMU Massive Multiple-Input Multiple-Output Unit
NEXRAD Next-Generation Radar
NR New Radio
OOBE Out-of-Band-Emission
PC Personal Computer PCS Personal Communications Service
PDA Personal Digital Assistant
RAM Random Access Memory
RET Remote Electrical Tilt
RF Radio-Frequency
RFI Radio-Frequency Interference
RLF Radio Link Failure
R/N Relay Node
RNR Reverse Noise Rise
ROM Read Only Memory
RRU Remote Radio Unit
RSRP Reference Transmission Receive Power
RSRQ Reference Transmission Receive Quality
RSSI Received Transmission Strength Indicator
SINR Signal-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Accordingly, the embodiments may take the form of a hardware embodiment, or an embodiment combining software and hardware. An embodiment takes the form of a computer-program product that includes computer-useable instructions embodied on one or more computer-readable media. Computer-readable media comprise media implemented in any method or technology for storing information. Examples of stored information include computer-useable instructions, data structures, program modules, and other data representations.

"Computer-readable media" can be any available media and may include volatile and nonvolatile media, as well as removable and non-removable media. By way of example, and not limitation, computer-readable media may include computer storage media and communication media. "Computer storage media" may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 600. Computer storage media does not comprise signals per se.

"Communication media" typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "telecommunications network" refers to a network comprised of wireless and wired components that provide wireless communications service coverage to one or more user equipment. The telecommunications network may comprise one or more base stations, one or more cell sites (i.e., managed by a base station), one or more cell towers (i.e., having an antenna) associated with each base station or cell site, a gateway, a backhaul server that connects two or more base stations, a database, power supply, sensors, and other components not discussed herein, in various embodiments.

The terms "base station" and "cell site" may be used interchangeable herein to refer to a defined wireless communications service coverage area (i.e., a geographic area) serviced by a base station. It will be understood that one base station may control one cell site with one cell tower, or alternatively, one base station may control multiple cell sites having multiple cell towers. As discussed herein, a base station is deployed in the telecommunications network to broadcast, transmit, synchronize, and receive wireless signals in order to communicate with, verify, authenticate, and provide wireless communications service coverage to one or more user equipment that seeks to join and utilize the telecommunications network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more protocols (e.g., 3G, 4G, LTE, 5G, mMIMO) as discussed hereinafter.

The terms "user equipment," "mobile device," and "wireless communication device" are used interchangeably to refer to a device employed by an end-user that communicates using a telecommunications network. User equipment generally includes one or more antenna coupled to a radio for exchanging (e.g., transmitting and receiving) transmissions with a nearby base station, via an antenna array of the base station. In embodiments, user equipment may take on any variety of devices, such as a personal computer, a laptop computer, a tablet, a netbook, a mobile phone, a smart phone, a personal digital assistant, a wearable device, a fitness tracker, or any other device capable of communicating using one or more resources of the telecommunications network. User equipment may include components such as software and hardware, a processor, a memory, a display component, a power supply or power source, a speaker, a touch-input component, a keyboard, and the like. In embodiments, some of the user equipment discussed herein may include current user equipment capable of using 5G protocols and having backward compatibility with prior protocol(s), current user equipment capable of using 5G protocols and lacking backward compatibility with prior protocol(s), and legacy user equipment that is not capable of using 5G protocol.

The terms "radio," "antenna" and "antenna array" are used interchangeably to refer to a radio that utilizes an antenna to facilitate sending and receiving wireless radio-frequency signals. The radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

The term "dual technology" is used herein to indicate that at least two distinct technologies are available for concurrent utilization, for example, by a radio and corresponding antenna array. However, it will be understood from this discussion herein that radios that are capable of operating with more than two technologies are also contemplated to be within the scope of the invention and the term "dual" is not to be construed as specifically limiting the embodiments of the invention.

The term "mMIMO" may refer to one or more high element capacity antenna configurations, such as Full Dimension or Massive Multiple-Input Multiple-Output antenna configurations (interchangeably referred to as "FD MIMO" or "mMIMO") configurations. mMIMO antenna arrays have a plurality of transmitting and receiving antenna elements that are, generally, physically arranged in a compact and high number configuration. In embodiments, the compact and dense configuration of the plurality of antenna elements within a single antenna may increase wireless network performance and throughput compared to prior, non-compact and/or low density antenna elements. For example of scale, a mMIMO antenna array may have approximately 64 to 128 individual antenna elements, though this is only an example and is not to be construed as limiting the number of antenna elements in any array. Additionally, for example, a mMIMO antenna array may generate a beam having a narrower beam width relative to a non-MIMO antenna array.

Overview

Generally, antenna arrays are located at an access point that is controlled by a base station. The antenna arrays may transmit and/or receive signals using one protocol, in embodiments. For example, an antenna array may be configured with software that controls the hardware components and operation of the antenna array so that the antenna array operates using a 4G protocol, instead of a 5G protocol. In another example, an antenna array may be configured with software that controls the hardware components and operation of the antenna array so that the antenna array operates using a 5G protocol, instead of a 4G protocol. Using a protocol, the antenna arrays may facilitate communication between the controlling base station and one or more neighboring base stations (e.g., neighboring cell sites) that are within wireless communications range of the antenna arrays.

Technological problems may arise when user equipment and/or antenna arrays are configured to operate using only one protocol in a telecommunications network that supports more than one protocol. For example, one or more legacy user equipment that only operates using 4G protocols (or other prior protocols) may encounter wireless communications service disruptions when entering a service area that is supported by an antenna array that is configured to operate using only 5G protocols (e.g., antenna array lacks backwards compatibility with another protocol). Similarly, user equipment that only operates using 5G protocols (e.g., user equipment lacks backwards capability with another protocol) may encounter wireless communications service disruptions when entering a service area that is supported by an antenna array that is configured to operate using only 4G protocols. The inability of the antenna array to provide service coverage to the user equipment, in each example, may result in a radio link failure at the controlling base station, for example. This technological problem arises from the concurrent deployment of multiple protocols within a telecommunications network that concurrently serves legacy user equipment and current user equipment lacking backward compatibility, using antenna arrays of various configurations that may also lack backwards compatibility with at least one other protocol.

Conventionally, wireless communication carriers deploy at least two base stations for a single service area (e.g., one base station for each distinct protocol), in an attempt to provide stable and consistent wireless communication service coverage within the single service area to both legacy and current user equipment. This double-deployment increases the network complexity and vastly increases the total power consumption across the entire telecommunications network. The double-deployment also results in the additional cost to secure multiple real-estate leases and time-consuming, expensive installations of multiple bases stations for one service area.

Embodiments herein overcome the technological problems discussed above and provide technological improvements over conventional solutions, as discussed hereinafter. In embodiments, a technological solution is provided by virtually partitioning a single antenna array controlled by a base station (i.e., a "controlling" base station) into two or more distinct portions of antenna elements that utilize distinct or different wireless technologies (i.e., "dual technology" mode). At a high level, by adjusting the transmission power and/or the electronic tilt of one portion of elements for a corresponding wireless technology, radio link failures at the controlling base station may be reduced, in embodiments.

In some embodiments, an antenna array is virtually partitioned so that a first portion of individual antenna elements operate using a first technology and a second portion of the individual antenna elements operate using a second technology. In embodiments, the antenna elements of the first and second portions may be controlled independent of each other. For example, the transmission power of the first portion of antenna elements may be increased or decreased independent of the transmission power of the second portion of antenna elements. Increasing the transmission power of the first portion of antenna elements may increase the signal strength and thus, may extend the wireless transmission range or "reach" for the first portion of the antenna elements, for example. In addition to adjusting the transmission power, the electronic tilt (i.e., degree of angle) of the first portion of elements may be increased or decreased independent of the electronic tilt setting of the second portion of antenna elements, in embodiments. Increasing the electronic tilt setting of the first portion of antenna elements may increase and extend the wireless transmission range or "reach" for the first portion of the antenna elements, for example. Therefore, by adjusting the first portion of the antenna elements in transmission power and/or electronic tilt, radio link failures at the base station are reduced by increasing the signal strength of transmissions from the first portion of antenna elements using the first technology and by increasing the wireless transmission range or "reach" of transmissions from the first portion of antenna elements using the first technology, for example. In some embodiments, because the first and second portions of antenna elements are physically located within the same antenna array, the first and second portions of antenna elements are physically linked such that a physical tilt of each portion cannot be adjusted independently. As such, electronic tilt may be adjusted.

Because the first portion of antenna elements utilize the first technology, radio link failures resulting from user equipment attempting to gain service from the base station through the first technology may be reduced in occurrence, by overall number and/or in the rate of occurrence at the controlling base station that is responsible for the antenna array having the first portion of antenna elements, using the antenna setting adjustments mentioned above.

In further embodiments, the controlling base station monitors the SINR levels at one or more neighboring stations before, during, and/or after changes are made to the first portion of antenna elements (e.g., changing signal strength and/or electronic tilt). The controlling base station may modify the previously made adjustments to the antenna settings of the first portion of antenna elements based on a decrease in the SINR levels experienced at one or more neighboring stations, for example, wherein the decrease in SINR levels may indicate that base station to base station interference is resulting from increased transmission strength of the first portion of the antenna elements.

Example System

Figure 1:
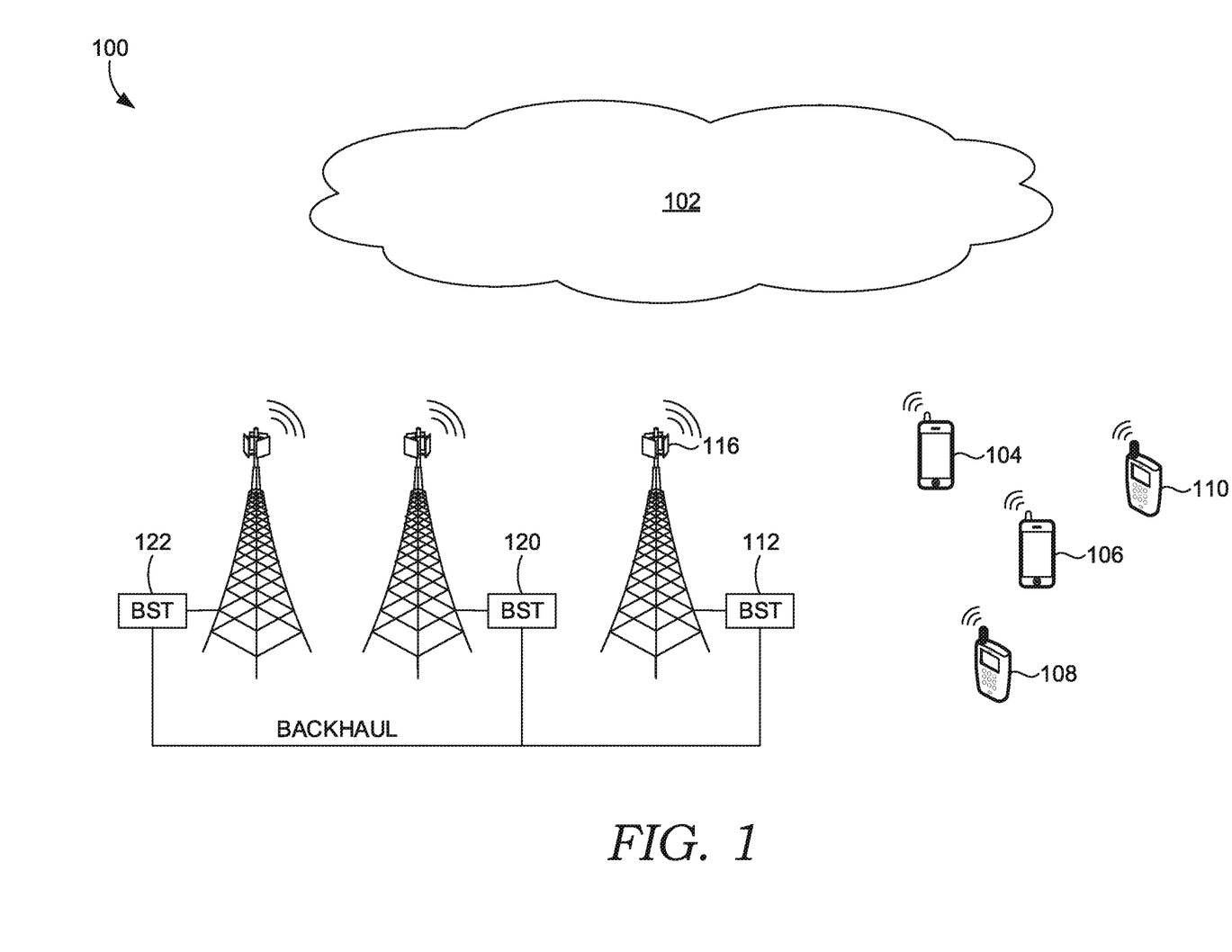
FIG. 1 is a diagram of an example network environment, in accordance with some aspects of the technology described herein.

Beginning with FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a telecommunications network 102 that provides service to current user equipment 104 and 106 and one or more legacy user equipment 108 and 110. The telecommunications network 102 may be accessible through a base station 112 that is connected to a backhaul server (not shown). The base station 112 may manage or otherwise control the operations of components of a cell site, including an antenna array 116. The antenna array 116 may have a plurality of antenna elements, in embodiments. In one embodiment, the antenna array 116 is configured to have a plurality of elements that in number, arrangement, and density, are configured for mMIMO. In one such embodiment, the base station 112 may include a controller, such as a Massive Multiple-Input Multiple-Output Unit (MMU) for controlling a mMIMO configured antenna array, such as antenna array 116 having a plurality of antenna elements. The base station 112 may use the controller to monitor radio link failures that occur at the base station, dynamically and/or as stored in a log in a data store, as discussed hereinafter.

The base station 112 may use a radio that is connected to the antenna array 116 by a physical RF path, where the radio is used to cause the antenna array 116 to transmit radio-frequency signals using the plurality of antenna elements. The plurality of antenna elements in the antenna array 116 may include a first portion of antenna elements 118A and a second portion of antenna elements 118B, shown in FIG. 2. In embodiments, the plurality of antenna elements of the antenna array 116 may be partitioned so that a first portion of antenna elements 118A may be associated with a first technology and a second portion of antenna elements 118B may be associated with a second technology. In one embodiment, the plurality of antenna elements may be partitioned or "split" in halves so that a first half of the antenna elements 118A may be associated with a first technology and a second half of the antenna elements 118B may be associated with a second technology.

Figure 2:
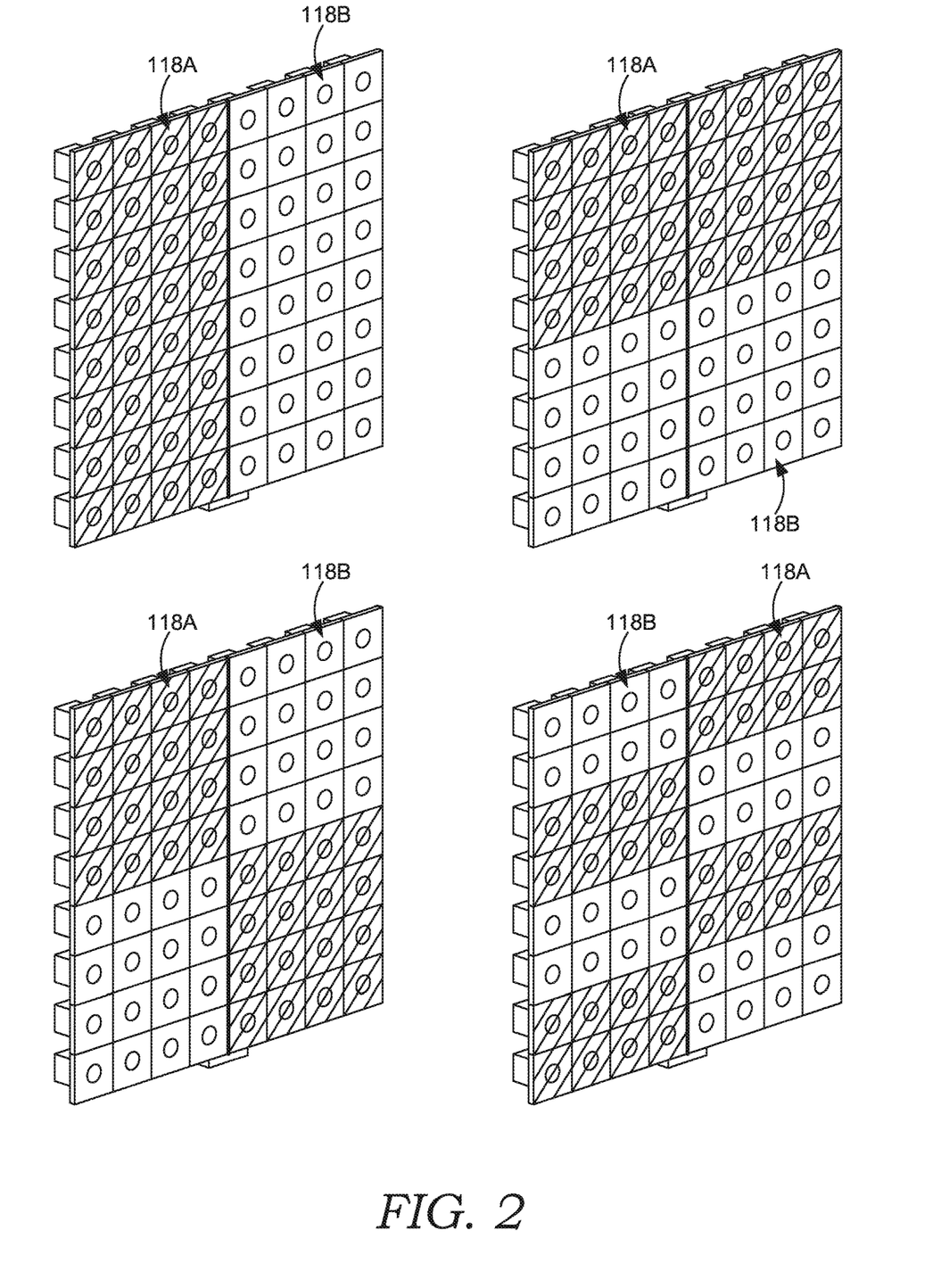
FIG. 2 is a diagram of example antenna array partitions, in accordance with some aspects of the technology described herein.

Each portion of the plurality of antenna elements may only operate using only one distinct protocol relative to the other portions in the antenna array, in embodiments. In one example, a first portion of antenna elements 118A may operate using 5G protocols and the second portion of antenna elements 118B may operate using 4G protocols. As illustrated in FIG. 2, for example, the plurality of antenna elements may be apportioned or virtually partitioned into the first and second portions 118A and 118B using a variety of configurations, and the embodiments herein are not limited to only those apportionments depicted, nor are the embodiments herein limited to balanced-array apportionments or specific ratios between various portions of the antenna array. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

The base station 112 may provide current user equipment 104 and 106 and legacy user equipment 108 and 110 with access to the telecommunications network 102, in embodiments. In some embodiments, the first portion of antenna elements communicate with current user equipment 104 and 106 using 5G protocols and the second portion of the antenna elements communicate with legacy user equipment 108 and 110 using 4G protocol. In such an embodiment, for example, the antenna array 116 is operating in a EN-DC mode. When operating in the dual technology mode, the antenna array 116 may concurrently connect to and communicate with the current user equipment 104 and 106 and legacy user equipment 108 and 110 using two or more distinct wireless technologies.

Accordingly, in one example, when the antenna array 116 is operating in the EN-DC mode, the base station 112 concurrently acts an Evolved Node B (eNodeB) and a Next Generation Node B (gNodeB). As such, base station 112, which corresponds to a single base station and single cell tower in some embodiments, provides service to both current and legacy user equipment, overcoming and obviating the need for conventional "double-deployment." In addition to communicating with the current user equipment 104 and 106 and legacy user equipment 108 and 110, the base station 112 may also communicate with one or more neighboring base stations. In some embodiments, the base station 112 may communicate with neighboring base station 120 using a first technology and may communicate with another neighboring base station 122 using the second technology. For example, because the base station 112 may operate concurrently as an eNodeB and a gNodeB using the antenna array 116 that is partitioned, the base station 112 may communicate with other base stations, including legacy base stations that cannot use a current protocols such as 5G, for example, or current base stations that lack backward compatibility with prior protocols, such as 4G, for example. In embodiments, the base station 112 may bi-directionally exchange information with neighboring base stations 120 and 122 through an X2 interface or X2 link. Information regarding signal quality, radio link failures, and SINR levels at each of the neighboring base stations 120 and 122 may be communicated to the base station 112 via the X2 link, as discussed hereinafter. Additionally or alternatively, information regarding signal quality, radio link failures, and SINR levels at each of the neighboring base stations 120 and 122 may be communicated to the base station 112 over the backhaul.

The base station 112 may include a controller, such as an MMU, that enables the base station 112 to adjust or modify the signal transmission strength of the plurality of antenna elements in the antenna array 116. Specifically, the controller may enable the transmission strength of the plurality of antenna elements to be modified, in embodiments. Additionally, the controller may enable the electronic tilt (i.e., phase shift) of the plurality of antenna elements to be modified, in some embodiments. In embodiments, the operation and settings of each of the plurality of antenna elements may be individually controlled and adjusted by the base station 112 using the controller. In some embodiments herein, the operation and settings of the first portion of antenna elements 118A may be controlled and adjusted as a group by the base station 112 using a controller, such as an MMU, independent of the second portion of antenna elements 118B. In a similar fashion, the operation and settings of the second portion of antenna elements 118B may be controlled and adjusted as a group by the base station 112 using the controller, independent of the first portion of antenna elements 118A. Accordingly, the base station 112 may use a controller to independently adjust different groups or portions of antenna elements within one antenna array.

In embodiments, the base station 112 may monitor a number of radio link failures occurring at the base station 112. In some embodiments, the base station 112 may monitor and measure a rate (e.g., quantity over a defined period of time) of radio link failures occurring at the base station 112. In further embodiments, the base station 112 may monitor a number of radio link failures occurring at the base station 112 where those radio link failures are specific to the first technology (e.g., 5G). Additionally, in some embodiments, the base station 112 may monitor a number of radio link failures occurring at the base station 112 that are specific to the second technology (e.g., 4G). Generally, a radio link failure occurs when user equipment experience a signal of low strength (i.e., weak) or degraded quality from the antenna array 116, for example, such one or more of the downlink or uplink between the user equipment and the antenna array 116 (and base station 112) fails and service is interrupted or impaired. It will be understood that this is just one example of situation from which a radio link failure occurs and embodiments herein are not limited to specific or particular causes of radio link failures. For example, a radio link failure might occur when legacy user equipment 108 and 110 enters a new service coverage area of a neighboring base station that is 5G base station lacking backwards capability, wherein the legacy user equipment 108 and 110 is thus unable to connect to the 5G base station and telecommunications service is disrupted. In another example, a radio link failure might occur when current user equipment 104 and 106 lacking backwards compatibility with prior protocols enters a new service coverage area of a neighboring base station that is a 4G base station lacking 5G capability, wherein the current user equipment 104 and 106 is therefore unable to connect to the 4GG base station and telecommunications service is disrupted. Such radio link failures may be identified, recorded, and monitored by the base station 112.

In some embodiments, the base station 112 includes an element management system. In such embodiments, the base station 112 may identify, record, and attribute each occurrence of a radio link failure to the first technology or the second technology using the element management system. The element management system may include a data store that stores a log of events, such as radio link failures. For example, the base station 112 may identify that an antenna element in the first portion of antenna elements 118A experienced a radio link failure with legacy user equipment, and the base station 112 may attribute the radio link failure to the first technology. The radio link failure, time stamp, antenna element, portion of an antenna array, and technology associated with the radio link failure may be recorded and stored in the data store of the element management system. In another example, the base station 112 may identify that an antenna element in the second portion of antenna elements 118B experienced a radio link failure with current user equipment, and the base station 112 may attribute the radio link failure to the second technology. Thus, the base station 112 may measure and track radio link failures with regard to each respective technology of the antenna array 116 that is operating in EN-DC mode, in embodiments, by leveraging a data store.

In some embodiments, a controller of the element management system of the base station may be used monitor radio link failures stored in a data store. For example, the controller may execute or "run" computer-readable instructions or "code" to determine the rate of radio link failures using the data store, and may indicate an adjustment should be made to the settings of the antenna array. The base station may then adjust the setting of an antenna array, for example, to reduce the number of radio link failures as further discussed hereinafter.

Having described the network environment 100 and components operating therein, methods are discussed that can be performed within the network environment 100 and using the components discussed in FIG. 1.

Example Methods

Figure 3:
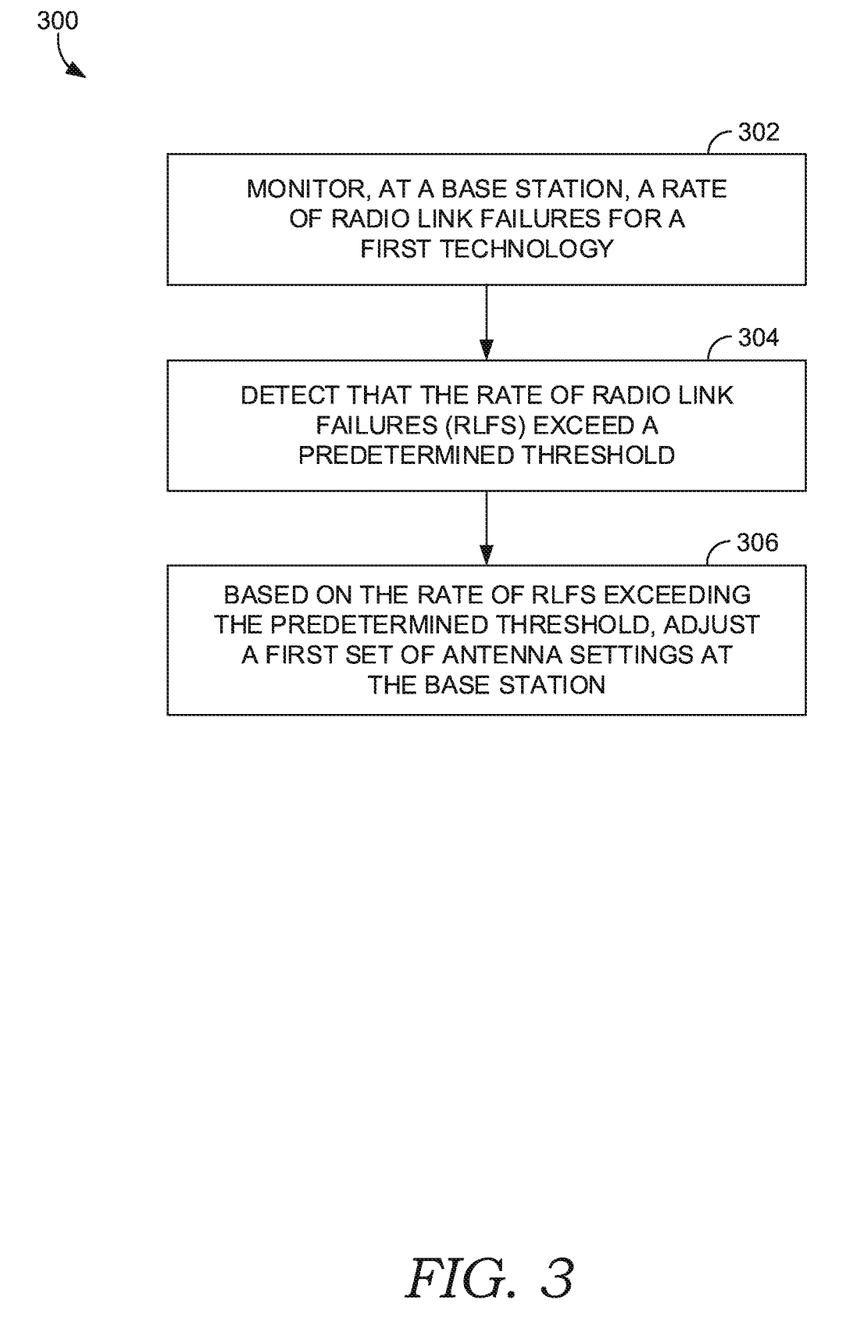
FIG. 3 is a flow diagram showing an example method for dual technology antenna operation.

FIG. 3 provides an example of a method 300 for monitoring and changing dual technology antenna operation at a base station, in accordance with embodiments herein. In embodiments, the method 300 is performed at a base station, for example, such as the base station 112 of FIG. 1. In embodiments, a rate of radio link failures for a first technology is monitored at a base station, shown at block 302. For example, the base station, at which the radio link failures are occurring for the first technology, may have an antenna array that is partitioned into a first portion and a second portion of antenna elements, wherein the first portion of antenna elements utilizes the first technology and the second portion of the antenna elements utilizes a second, different technology. In some embodiments, the base station controls a radio that operates a mMIMO antenna array. Further, the radio may be a dual technology radio, for example, such as an EN-DC radio, that may be used to control the technologies used by portions of the same antenna array at the base station, in an embodiment. In one embodiment, the first technology may be a 5G protocol. In a further embodiment, the second technology may be a 4G protocol. In some embodiments, the first and second technology are distinct but may operate within the same frequency band.

At block 304, the method 300 detects whether the rate of radio link failures meets or exceeds a predetermined threshold. In one embodiment, the base station detects that the rate of radio link failures meets or exceeds the predetermined threshold by accessing a data store that logs radio link failures that occur at the base station. In further embodiments, a controller of an element management system of a base station is used to detect whether a number, or a rate, of radio link failures have occurred for the first technology, by referencing a data store that logs radio link failures. For example, the controller may execute or "run" computer-readable instructions or "code" to determine the rate of radio link failures using the data store, and may indicate an adjustment should be made to the settings of the antenna array. The base station may then adjust the setting of an antenna array, for example, to reduce the number of radio link failures.

At block 306, based on the rate of radio link failures meeting or exceeding the predetermined threshold, a first set of antenna settings are adjusted at the base station. In embodiments, the first set of antenna settings corresponds to a first plurality of antenna elements that utilize the first technology. For example, the first set of antenna settings may not correspond to a second plurality of antenna elements that utilize the second technology, such that only those antenna elements utilizing the first technology (i.e., a first plurality of antenna elements) are adjusted within the antenna array. In some embodiments, the first set of antenna settings is adjusted by increasing a transmission strength (or power) of antenna elements in an antenna array at the base station, wherein the adjusted antenna elements utilize the first technology (i.e., antenna elements that do not utilize the second technology). Additionally, in some embodiments, the first set of antenna settings is adjusted by increasing an electronic tilt (i.e., electronic tilt angle) of antenna elements in an antenna array at the base station, wherein the adjusted antenna elements utilize the first technology (i.e., antenna elements that do not utilize the second technology). Generally, the remaining antenna elements that utilize a second technology in the same antenna array are not adjusted. For example, the antenna elements that utilize 5G protocols are adjusted, and the antenna elements that utilize 4G protocols are not adjusted. Therefore, in some embodiments, a second set of antenna settings that are associated with the second portion of antenna elements using a second technology are not concurrently adjusted within the antenna array.

In further embodiments, subsequent to adjusting the first set of antenna settings, the base station or the controller may determine whether the number, or the rate, of radio link failures in the first technology has decreased within or over a defined period of time. The base station and/or controller may, for example, determine and/or confirm that the adjustment to the first portion of antenna elements has resulted in a reduction in the number, magnitude, or rate of radio link failures in the first technology over a defined period of time.

Figure 4:
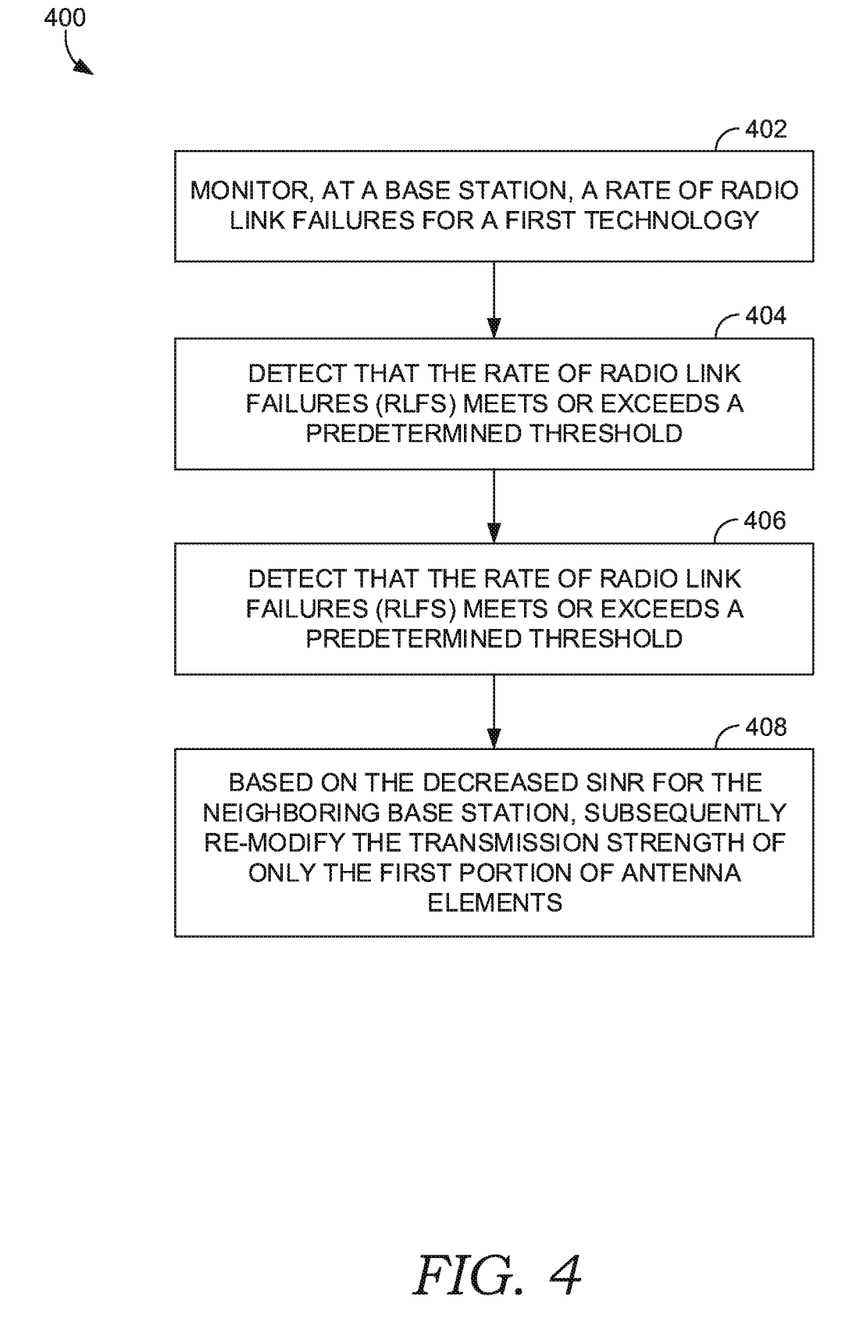
FIG. 4 is a flow diagram showing an example method for dual technology antenna operation.

FIG. 4 provides an example of a method 400 for monitoring and changing dual technology antenna operation at a base station, in accordance with embodiments herein. As should be understood, some aspects of the method 400 are discussed with brevity herein as these aspects have been previously described, for example, with regard to prior methods and environments herein.

In embodiments, a rate of radio link failures for a first technology is monitored at a base station, shown at block 402. At block 404, the method 400 detects whether the rate of radio link failures meets or exceeds a predetermined threshold. And, at block 406, based on the rate of radio link failures meeting or exceeding the predetermined threshold, a first set of antenna settings are adjusted at the base station, in accordance with the method 400. Additionally, in further embodiments, an indication is received that a neighboring base station has experienced or is experiencing a decreased Signal to Interference plus Noise Ratio (SINR), shown at block 408. Generally, a decrease in SINR may be used to indicate that occurrence of inter-cell interference (i.e., base station to base station interference) being experienced at the respective base station to which the SINR is measured. For example, when a first set of settings of a first portion of antenna elements that utilize the first technology are adjusted by increasing transmission signal strength and/or by increasing an electronic tilt, the increased wireless transmission range of the first portion of antenna elements may unintentionally cause interference at a neighboring base station. Therefore, in some embodiments, the base station may receive SINR information for a neighboring base station, for example, over the backhaul or the X2 link.

Based on the SINR information indicating that inter-cell interference is occurring for the neighboring base station, the base station controlling the antenna array may re-modify the transmission strength of only the first portion of antenna elements, as shown at block 410. For example, the transmission strength of the antenna elements utilizing the first technology may be reduced, at least partially relative to the first adjustment implemented to reduce radio link failures, in order to decrease inter-cell interference. The reduction in transmission strength of the first portion of antenna elements using the first technology may reduce inter-cell interference at the neighboring base station, which may be determined and/or confirming by receiving new SINR information that indicates an increased SINR at the neighboring base station.

Figure 5:
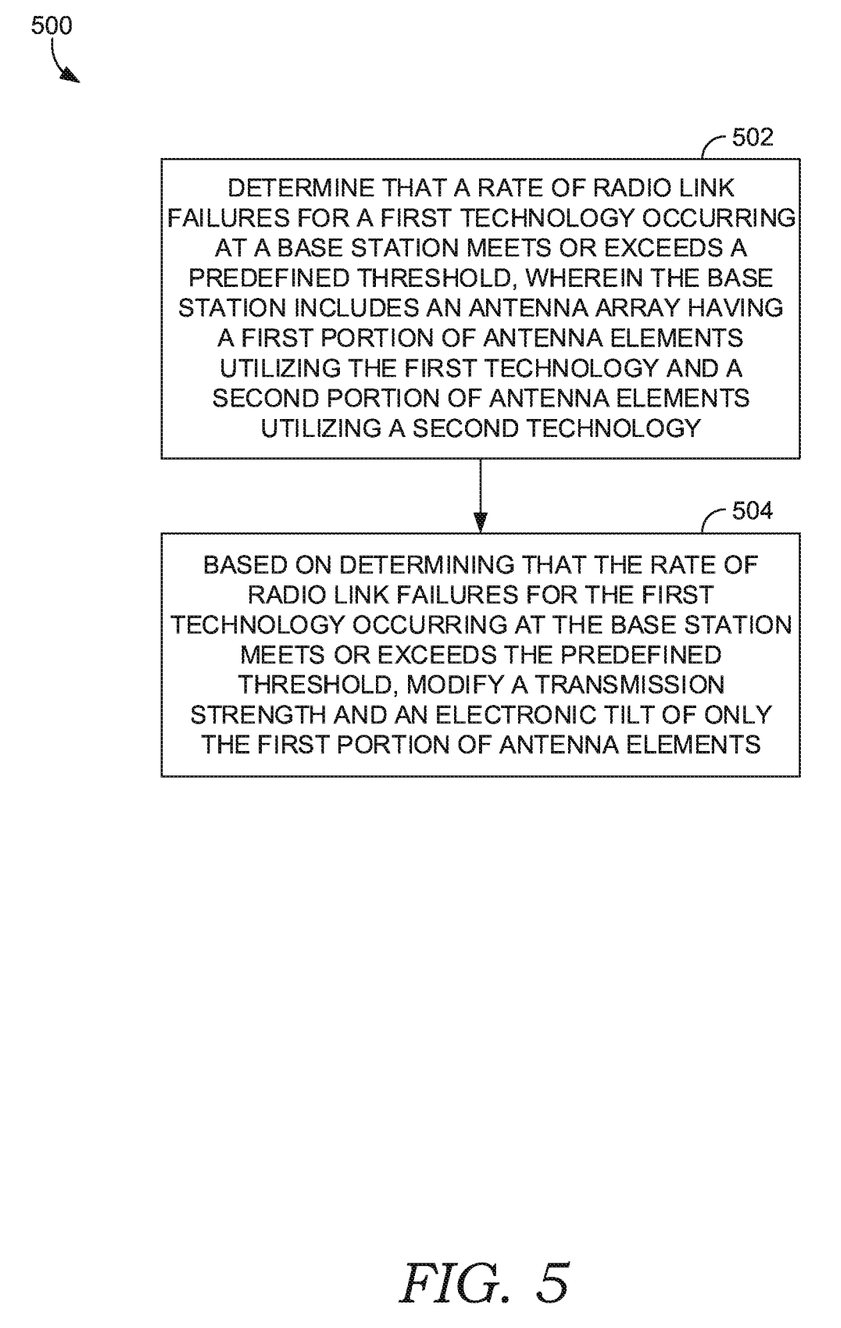
FIG. 5 is a flow diagram showing an example method for dual technology antenna operation.

FIG. 5 provides another example of a method 500 for monitoring and changing dual technology antenna operation at a base station, in accordance with embodiments herein. As should be understood, some aspects of the method 500 are discussed with brevity herein as these aspect have been previously described, for example, with regard to prior methods and environments herein. Beginning at block 502, the base station or a controller associated with the base station determines that a rate of radio link failures for a first technology occurring at a base station meets or exceeds a predefined threshold, wherein the base station includes an antenna array having a first portion of antenna elements utilizing the first technology and a second portion of antenna elements utilizing a second technology. At block 504, based on determining that the rate of radio link failures for the first technology occurring at the base station meets or exceeds the predefined threshold, the base station or controller modifies a transmission strength and an electronic tilt of only the first portion of antenna element. In embodiments, modifying the transmission strength and the electronic tilt of only the first portion of antenna elements decreases the rate of radio link failures for the first technology occurring at the base station. At block 506, SINR information for a neighboring base station is received. And, at block 508, based on the SINR information for the neighboring base station, the base station or controller subsequently re-modifies the transmission strength of only the first portion of antenna elements. In embodiments, subsequently re-modifying the transmission strength of only the first portion of antenna elements to lower the transmission strength may reduce inter-cell interference at a neighboring base station that may have resulted by the transmission strength was increased to reduce radio link failures at the base station for the first technology. The inter-cell interference may be determined to be reduced by receiving and confirming a reduced SINR at the neighboring base station subsequent to the re-modification of the transmission strength.

Figure 6:
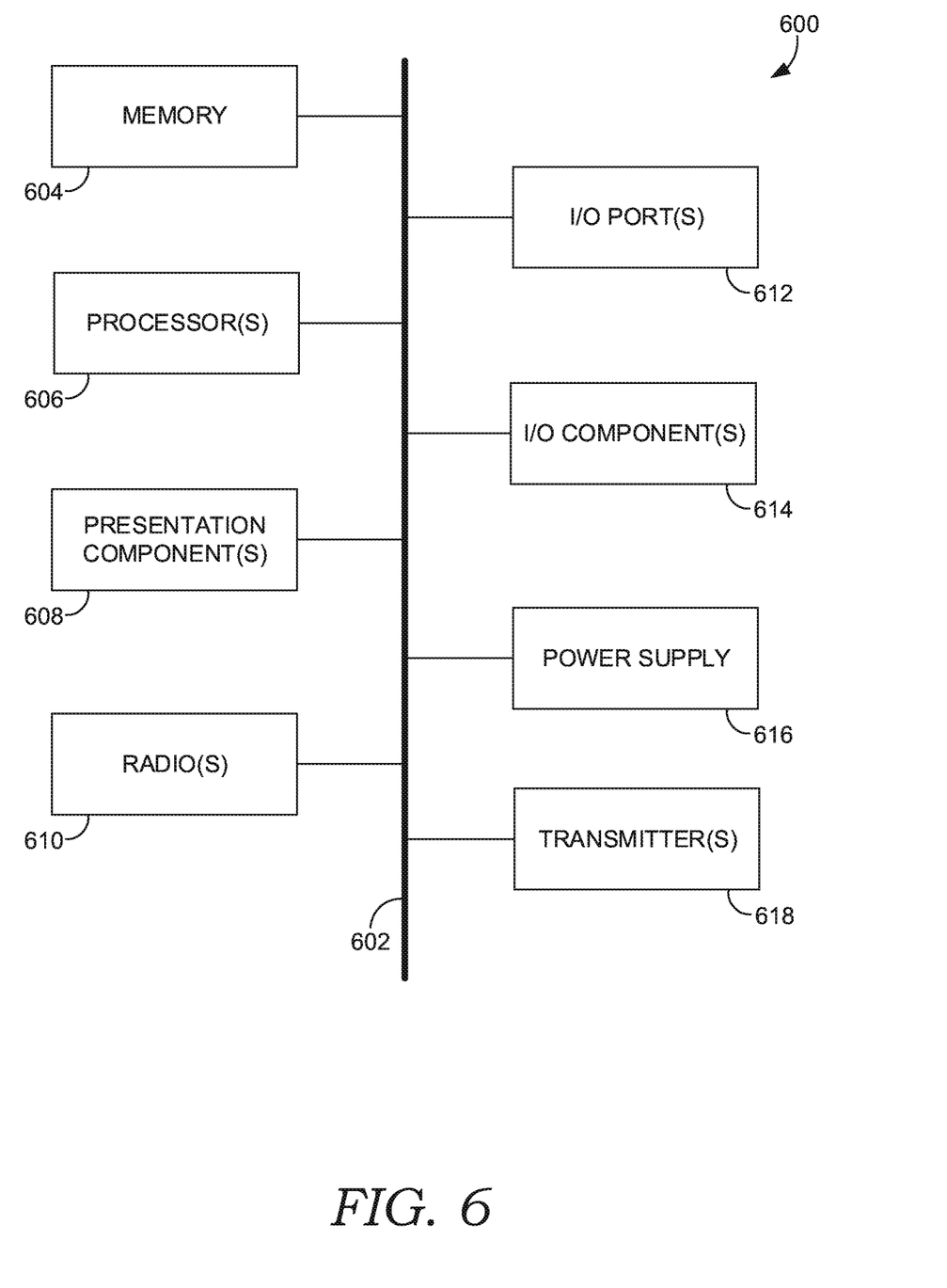
FIG. 6 depicts an example computing device suitable for use in implementations of the present disclosure.

Referring to FIG. 6, a block diagram of an example of a computing device 600 suitable for use in implementations of the technology described herein is provided. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated. In aspects, the computing device 600 may be a base station. In another embodiment, the computing device 600 may be user equipment capable of two-way wireless communications with an access point. Some non-limiting examples of the computing device 600 include a base station, a controller at a base station, a backhaul server, a personal computer, a cell phone, current user equipment, legacy user equipment, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 6, computing device 600 includes a bus 602 that directly or indirectly couples various components together. The bus 602 may directly or indirectly one or more of memory 604, processor(s) 606, presentation component(s) 608 (if applicable), radio(s) 610, input/output (I/O) port(s) 612, input/output (I/O) component(s) 614, power supply 616, and/or transmitter(s) 618. Although the components of FIG. 6 are shown with lines for the sake of clarity, in reality, delineating various components is not so clear, and metaphorically, the lines would more accurately be grey and fuzzy. For example, one may consider a presentation component(s) 608 such as a display device to be one of I/O components 614. Also, the processor(s) 606 may include memory 604, in another example. The present disclosure hereof recognizes that such is the nature of the art, and reiterates that FIG. 6 is merely illustrative of an example of a computing device 600 that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 604 may take the form of memory components described herein. Thus, further elaboration will not be provided here, but it should be noted that memory 604 may include any type of tangible medium that is capable of storing information, such as a database or data store. A database or data store may be any collection of records, files, or information encoded as electronic data and stored in memory 604, for example. In one embodiment, memory 604 may include a set of embodied computer-readable and executable instructions that, when executed, facilitate various functions or elements disclosed herein. These embodied instructions will variously be referred to as "instructions" or an "application" for short.

Processor(s) 606 may be multiple processors that receive instructions and process them accordingly. Presentation component(s) 608, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 610 represents one or more radios that facilitate communication with a wireless telecommunications network. For example, radio(s) 610 may be connected to one or more antenna elements through a physical path. Illustrative wireless telecommunications technologies include CDMA, GPRS, TDMA, GSM, and the like. Radio(s) 610 might additionally or alternatively facilitate other types of wireless communications including Wi-Fi, WiMAX, LTE, 3G, 4G, LTE, mMIMO, 5G, NR, VoLTE, and/or other VoIP communications. As can be appreciated, in various embodiments, radio(s) 610 can be configured to concurrently support multiple technologies, as previously discussed herein. As such, each of many radio(s) 610 may be used to separately control portions of an antenna array, for example, where at least one portion utilizes a distinct technology relative to another portion in the same antenna array or at the same base station or cell site. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 612 may take a variety of forms. Exemplary I/O ports 612 may include a USB jack, a stereo jack, an infrared port, a firewire port, other proprietary communications ports, and the like. Input/output (I/O) components 614 may comprise keyboards, microphones, speakers, touchscreens, and/or any other item usable to directly or indirectly input data into the computing device 600.

Power supply 622 may include batteries, fuel cells, and/or any other component that may act as a power source to supply power to the computing device 600 or to other network components, including through one or more electrical connections or couplings. Power supply 622 may be configured to selectively supply power to different components independently and/or concurrently.

Finally, regarding FIGS. 1 through 6, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of a devices and/or components.

It is noted that embodiments of the present invention described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method comprising:
monitoring, at a base station, a rate of radio link failures for a first technology, wherein the base station is communicatively coupled to an Evolved-Universal Terrestrial Radio Access-New Radio Dual Connectivity (EN-DC) radio and a massive multiple-input, multiple-output (massive MIMO) antenna array having a first set of array elements utilizing a first technology and a second set of array elements utilizing a second technology;
detecting that the rate of radio link failures (RLFs) for the first technology exceed a predetermined threshold; and
based on the rate of RLFs exceeding the predetermined threshold, adjusting the first set of array elements settings at the base station independent of the second set of array elements.

2. The method of claim 1, further comprising:
receiving an indication that a neighboring base station has experienced a decreased Signal to Interference plus Noise Ratio (SINR); and
further adjusting the first set of antenna settings based at least in part on the indication.

3. The method of claim 1, wherein the first technology comprises 5G technology.

4. The method of claim 1, wherein the first set of antenna settings comprise one or more of an electronic tilt or a transmission power.

5. A system comprising:
a base station having a dual technology radio that is virtually partitioned between a first technology associated with a first set of antenna settings and a second technology associated with a second set of antenna settings;
an antenna array that is connected to the dual technology radio, wherein the antenna array is a massive multiple-input multiple-output (mMIMO) configured antenna array having a first portion of array elements utilizing the first technology and a second portion of array elements utilizing the second technology; and
an element management system that communicates with the base station, the element management system including:
a data store containing a log of events at the base station, the log of events including one or more radio link failures (RLFs) of one or more of the first technology or the second technology; and
a first controller that:
monitors a quantity of the one or more RLFs logged in the data store for the first technology;
runs computer-readable code to dynamically determine when to adjust the first set of antenna settings of the first portion of array elements independent of the second portion of array elements;
monitors a quantity of the one or more RLFs logged in the data store for the second technology; and
runs computer-readable code to dynamically determine when to adjust the second set of antenna settings of the second portion of array elements independent of the first portion of array elements.

6. The system of claim 5, wherein the first set of antenna settings comprises at least one of an electronic tilt or a transmission power.

7. The system of claim 5, wherein when the first technology is 5G technology, the second technology is 4G technology, and wherein when the first technology is 4G technology, the second technology is 5G technology.

8. The system of claim 5, wherein the first technology and the second technology radiate within a same frequency band.

9. The system of claim 5, wherein the first portion of antenna elements utilize 5G protocol and the second portion of antenna elements utilize 4G protocol.

10. The system of claim 9, wherein the first portion of antenna elements and the second portion of antenna elements are physically linked as located within the antenna array.

11. The system of claim 5, wherein the computer-readable code dynamically adjusts the first set of antenna settings according to a step function.

12. The system of claim 5, further comprising a x2 link interface that receives signal interference plus noise ratio (SINR) information for a neighboring base station, and wherein the computer-readable code further adjusts the first set of antenna settings in response to determining that the SINR increased for the neighboring base station based on the SINR information.

13. One or more non-transitory computer-readable storage media having computer-readable instructions embodied therein for execution by one or more processors, the computer-readable instructions comprising:
- monitoring radio link failures for a first technology and a second technology occurring at a base station, wherein the base station includes a massive multiple-input multiple-output (mMIMO) antenna array having a first portion of antenna elements utilizing the first technology and a second portion of antenna elements utilizing a second technology;
- determining that a rate of radio link failures for the first technology occurring at the base station meets or exceeds a first predefined threshold;
- based on determining that the rate of radio link failures for the first technology occurring at the base station meets or exceeds the first predefined threshold, modifying a transmission strength and an electronic tilt of only the first portion of antenna elements;
- determining that a rate of radio link failures for the second technology occurring at the base station meets or exceeds a second predefined threshold; and
- based on determining that the rate of radio link failures for the second technology occurring at the base station meets or exceeds the second predefined threshold, modifying a transmission strength and an electronic tilt of only the second portion of antenna elements,
- wherein the first portion of antenna elements and the second portion of antenna elements are modifiable independent of each other.

14. The non-transitory computer-readable storage media of claim 13, further comprising:
- receiving SINR information for a neighboring base station; and
- based on the SINR information for the neighboring base station, subsequently re-modifying the transmission strength of only the first portion of antenna elements.

15. The non-transitory computer-readable storage media of claim 14, wherein modifying the transmission strength and the electronic tilt of only the first portion of antenna elements decreases the rate of radio link failures for the first technology occurring at the base station, and wherein subsequently re-modifying the transmission strength of only the first portion of antenna elements decreases a SINR at the neighboring base station resulting from the first plurality of antenna elements at the base station.

16. The non-transitory computer-readable storage media of claim 13, wherein the first predefined threshold is different from the second predefined threshold.

17. The non-transitory computer-readable storage media of claim 13, wherein the first predefined threshold and the second predefined threshold are the same.

* * * * *